United States Patent [19]

Alley

[11] 4,087,098

[45] May 2, 1978

[54] SEAL FOR REPAIR OF A SHAFT OR THE LIKE AND A METHOD FOR DOING SAME

[76] Inventor: David W. Alley, 5917 Harbrook, Houston, Tex. 77017

[21] Appl. No.: 798,448

[22] Filed: May 19, 1977

[51] Int. Cl.² .................................................. F16J 15/34
[52] U.S. Cl. ............................................................ 277/9
[58] Field of Search ..................... 277/1, 9, 11, 81, 85, 277/94, 153

[56] References Cited

U.S. PATENT DOCUMENTS

| | | | |
|---|---|---|---|
| 3,072,413 | 1/1963 | Parks | 277/153 |
| 3,207,521 | 9/1965 | Dega | 277/153 |
| 3,447,810 | 6/1969 | Porter | 277/85 |
| 3,675,933 | 7/1972 | Nappe | 277/9 |
| 3,947,944 | 4/1976 | Washington | 277/1 |

*Primary Examiner*—Robert I. Smith
*Attorney, Agent, or Firm*—Pravel, Wilson & Gambrell

[57] ABSTRACT

A seal device adapted to be disposed between two surfaces, usually a shaft surface and a mechanical seal and a method for repair of a shaft and the like, wherein the shaft is formed having a longitudinal taper for receiving a seal to be snugly fitted thereabout such taper, the preferred form of such seal being suitable for mounting with a shaft and including a method for repairing a surface of the shaft which has become worn, corroded or otherwise unsuitable for providing a sealing surface to cooperate with a mechanical seal.

12 Claims, 2 Drawing Figures

SEAL FOR REPAIR OF A SHAFT OR THE LIKE AND A METHOD FOR DOING SAME

BACKGROUND OF THE INVENTION

The field of this invention is repair devices for a shaft or the like.

It has been customary for rotating shafts to be sealed with mechanical seals in contact with the surface of the shaft. When the surface of the shaft became worn, corroded, or otherwise unsuitable for sealing with the mechanical seal, the shaft has normally been replaced because the expense of repair has been too great. Prior art alternatives to replacement of shafts in such situations include such devices as set forth in U.S. Pat. No. 3,918,724 to Alley, also the present inventor.

SUMMARY OF THE INVENTION

The present invention relates to a new and improved seal device and method for repairing a shaft, with the seal device being particularly suitable for mounting on a shaft to engage a mechanical seal so that a shaft which has become worn, corroded or otherwise unsuitable for sealing with a mechanical seal can be economically repaired, thereby avoiding the waste of replacement of the entire shaft. In the preferred embodiment of the seal device and method of repairing a shaft of the present invention, a seal is adapted to be disposed about a longitudinal taper formed on a portion of the shaft that has been reduced in diameter in order to eliminate the wear, corrosion, or otherwise unsuitable sealing surface on the shaft.

DESCRIPTION OF THE PREFERRED EMBODIMENT

Figure 1:
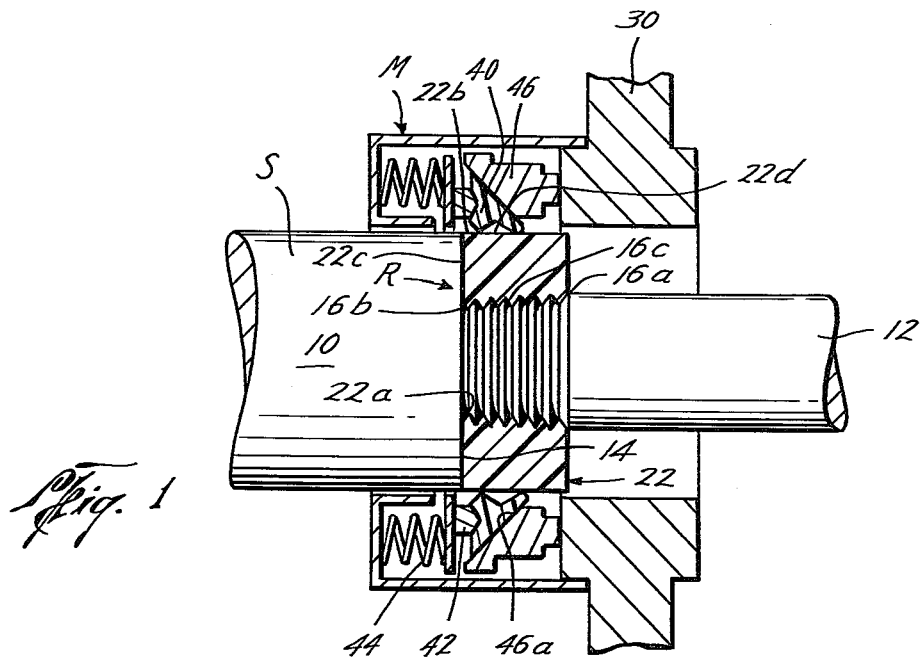
FIG. 1 is a view, partly in elevation and partly in section, illustrating the preferred form of the seal device of the present invention in position on a shaft, and sealing with a conventional mechanical seal disposed externally of the shaft; and, FIG. 2 is a sectional view, partly in elevation, of the shaft detailing the radial shoulder, logitudinal taper, and reduced diameter longitudinal portion of the shaft.

In the drawings, the letter D designates generally the seal device of the present invention which is adapted to be used on a shaft S in the preferred form of the invention, preferably in conjunction with a conventional mechanical seal M, as partially illustrated in FIG. 1.

As illustrated in FIG. 1, the shaft S has a first longitudinal portion 10 which is of larger diameter than a second, reduced longitudinal portion 12. In a typical use of the seal device D of the present invention, the shaft S will originally have the outside diameter of the first longitudinal portion 10 and because of wear, corrosion or other conditions which make it unsuitable for sealing with the mechanical seal M, the shaft S has become unusable or unsatisfactory for use. Under normal conditions, the shaft S would be discarded and replaced with a new shaft. However, with the present invention, the shaft S is repaired.

Figure 2:
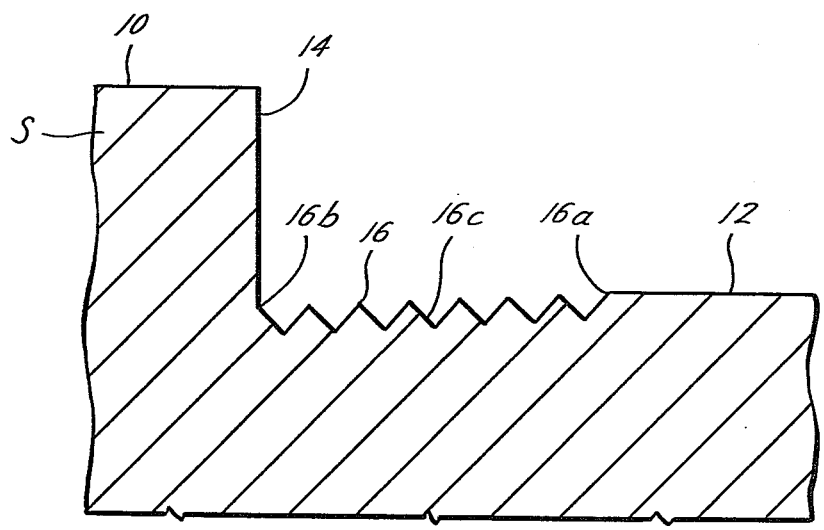

As shown in FIG. 2, the outside diameter of the first longitudinal portion 10, being the original outside diameter of the shaft S, is reduced to that of the second, reduced longitudinal portion 12, having a smaller diameter such that all wear, corrosion and other conditions which originally made the shaft S unsuitable for sealing, are removed resulting in a clean, machined surface for the outside diameter of the second, reduced longitudinal portion 12 of the shaft S.

A radial shoulder 14 is formed adjacent the outside diameter of the first longitudinal portion 10 and extends radially inwardly towards a longitudinal taper 16 formed beween the first longitudinal portion 10 and the second, reduced longitudinal portion 12 of the shaft S. Preferably, the longitudinal taper 16 is formed having a diameter substantially the same as that of the second, reduced longitudinal portion 12 adjacent thereto at taper end 16a of the longitudinal taper 16. Preferably, the longitudinal taper 16 at taper end 16b, adjacent radial shoulder 14 is of a smaller outside diameter than the outside diameter of the second, reduced longitudinal portion 12. It is preferred that the longitudinal taper 16 taper from the outside diameter of the second, reduced portion 12 from taper end 16a, reducing in diameter to taper end 16b, which is of a smaller outside diameter than second portion 12 adjacent radial shoulder 14. The longitudinal taper 16 has a plurality of serrations 16c formed on the outside surface thereof. Preferably, the serrations are of a "V" grooved configuration, forming a series of annular grooves about the longitudinal taper 16. It is preferred, but not by way of limitation, that the longitudinal taper 16 have a taper of approximately 15° with respect to the longitudinal axis of the shaft S in the preferred form of the seal device D of the present invention.

The seal device D of the present invention includes seal means 22. It is preferred that the sealing means 22 is formed of a sealing material, such as polytetrafluoroethylene sold under the trademark "Teflon" and similar materials, such as chlorotrifluoroethylene polymer, as well as other fluoroplastics. Further, by way of example, a combination of polytetrafluoroethylene and carbon has been found to be particularly well suited for the seal means 22 of the present invention. However, such is not intended to limit the wide variety of available seal means 22 that may be suitable.

Preferably, the seal means 22 is originally in the form of a cylinder having an inner circular bore 22a that preferably corresponds to the same diameter as the diameter of the longitudinal taper 16 at taper end 16b. Thus, the inner bore 22a is of lesser diameter than the diameter of the shaft S adjacent the second, reduced longitudinal portion 12. The original outer surface 22b of the seal means 22 is such that the radial thickness of the seal means 22 is at least originally equal to the distance between the taper end 16b of the longitudinal taper 16 and the outside diameter of the first portion 10 of the shaft S, also corresponding to the radial height of the radial shoulder 14. It is to be understood that this radial thickness is a minimum thickness for the seal means 22 and that the initial thickness thereof may be substantially greater.

It is preferred that the seal means 22 be snugly fitted about the longitudinal taper 16. This is accomplished by heating the seal means 22 by any appropriate means to cause expansion thereof. The heating of the seal means 22 results in the inner bore 22a, being of a lesser diameter than that of the second, reduced longitudinal portion 12 of the shaft S, to expand to such a size such that the heated seal means 22 may be placed over the second, reduced longitudinal portion 12 of the shaft S and positioned with radial surface 22c of the seal means 22 abutting radial shoulder 14 of the shaft S and with the inner bore 22a about the longitudinal taper 16. The seal means 22 is thereafter allowed to cool in this position, resulting in the seal means 22 contracting about the longitudinal taper 16 for providing a heat, shrink-fit of the seal means 22 on the longitudinal taper 16. As the seal means 22 contracts about the longitudinal taper 16, the serrations 16c grippingly engage the inner bore 22a of the seal means 22. Further, it is preferred that the seal means 22 be of such a longitudinal length that the seal means 22 extends from radial shoulder 14 to taper end 16a adjacent the second, reduced longitudinal portion 12 of the shaft S.

It will be appreciated that due to the original configuration of the seal means 22 being of a cylinder having a bore 22a substantially of the same diameter as that at taper end 16b, that upon shrink-fitting of the seal means 22 about the longitudinal taper 16, the seal means 22 will assume the shape of a truncated, conical shell corresponding and fitting roughly to the taper of longitudnal taper 16. The seal means 22, as shrunk-fit about the shaft S, is thereafter machined by rotating the shaft S and seal means 22 therewith, wherein the outside diameter of the seal means 22 is turned down to substantially approximate the outside diameter of the first longitudinal portion 10 of the shaft S for providing a sealing surface 22d of a cylindrical configuration for engaging the mechanical seal M. Thus, the seal means 22 has its inner bore 2a shrunk-fit into a tapered configuration about the longitudinal taper 16 in such a manner that it is grippingly engaged by serrations 16c and further provides a fluid-tight seal therebetween because of such a shrink-fit. Further, radial surface 22c of the seal means 22 sealably engages radial shoulder 14, and sealing surface 22d being substantially the same diameter as first longitudinal portion 10 of the shaft S.

The mechanical seal M which is illustrated in FIG. 1 is merely exemplary of many mechanical seals normally used with rotating shafts. As shown in FIG. 1, the mechanical seal M is supported in a body or housing 30, a portion of which is shown, and which may take any suitable configuration. An annular Teflon ring 40 provides a sealing contact with the machined, outer sealing surface 22d of the seal means 22 of the seal device D of the present invention. Such seal ring 40 is urged inwardly towards and maintains contact with the outer sealing surface 22d by reason of a pusher member 42 which is urged by a spring 44. The seal ring 40 is urged against an inclined surface 46a of a guide ring 46 of the mechanical seal M. It will be appreciated that the seal ring 40 may be any suitable surface with the housing 30 and may not even have any urging means such as the spring 44 with it.

Although the invention has been specifically described for an external seal on the external surface of a shaft, the seal device D of the present invention may be disposed internally within a tapered recess adapted to receive it for an internal seal, as is well understood by those skilled in the art.

The foregoing disclosure and description of the invention are illustrative and explanatory thereof, and varios changes in the size, shape and materials as well as in the details of the illustrated construction may be made without departing from the spirit of the invention.

I claim:

1. A seal device particularly adapted for sealing between a shaft and a mechanical seal, wherein the shaft has two longitudinal portions of different outside diameters positioned longitudinally in sequence, with only one end of each portion adjacent to only one end of the other, comprising:
   a shaft having:
      a large diameter longitudinal portion and a small diameter longitudinal portion positioned longitudinally in sequence;
      a radial shoulder formed adjacent said large diameter longitudinal portion of said shaft and extending radially inwardly; and,
      a longitudinal taper formed between said radial shoulder and said small diameter longitudinal portion of said shaft; and,
   seal means for sealing said shaft with the mechanical seal having:
      an outer sealing surface adapted to contact the mechanical seal;
      an inner sealing surface in engagement with said longitudinal taper; and,
      a radial sealing surface for engagement with said radial shoulder.

2. The structure of claim 1, wherein:
   said longitudinal taper is formed having a plurality of serrations about the exterior surface thereof to enhance engagement and to prevent slipping between said seal means and said longitudinal taper.

3. The structure of claim 1, wherein:
   said seal means is of a polytetrafluoroethylene and carbon composition.

4. The structure of claim 1, wherein:
   said longitudinal taper is of substantially the same diameter of said small diameter longitudinal portion and adjacent thereto, and is of a smaller diameter than said small diameter longitudinal portion of said shaft adjacent said radial shoulder.

5. The structure of claim 4, wherein:
   said longitudinal taper is approximately 15° of taper with respect to the longitudinal axis of said shaft.

6. The structure set forth in claim 1, wherein:
   said seal means is shrink-fitted about said longitudinal taper.

7. The structure of claim 6, wherein:
   said seal means has means therewith for expanding and contracting in response to heating and cooling thereof for mounting said seal means on said longitudinal taper in a proper heat-shrink manner.

8. A method of repairing a shaft for allowing continued use of the shaft and sealing between the shaft and a mechanical seal, comprising the steps of:
   reducing the outside diameter of the shaft to a smaller, reduced diameter longitudinal portion adjacent the portion of the shaft to be repaired;
   forming a radial shoulder between the outside diameter of the shaft and the smaller, reduced diameter longitudinal portion;
   machining a longitudinal taper on the shaft between the radial shoulder and the smaller, reduced diameter longitudinal portion of the shaft; and,
   fitting seal means on the shaft about the longitudinal taper for engaging the mechanical seal.

9. The method of claim 8, wherein said machining includes the step of:
   cutting a plurality of serrations about the longitudinal taper of the shaft to enhance engagement of and prevent slipping between the seal means and the longitudinal taper.

10. The method of claim 8, wherein said machining includes the step of:

forming the longitudinal taper with a diameter substantially the same as the smaller, reduced diameter longitudinal portion adjacent thereto and having a smaller diameter than the smaller, reduced diameter longitudinal portion of the shaft adjacent the radial shoulder.

11. The method of claim 8, wherein said fitting includes the steps of:

heating the seal means to cause expansion thereof to allow positioning of the seal means adjacent the longitudinal taper of the shaft; and, cooling the seal means adjacent the longitudinal taper of the shaft to allow the seal means to contract about the longitudinal taper of the shaft for providing a heat shrink-fit of the seal means on the longitudinal taper.

12. The method of claim 11, further including the step of:

machining the outside diameter of the seal means such that the outside diameter of the shaft and outside diameter of the seal means substantially correspond, permitting positive engagement between the seal means and the mechanical seal.

* * * * *